(12) United States Patent
Beverini et al.

(10) Patent No.: US 8,661,894 B2
(45) Date of Patent: Mar. 4, 2014

(54) MICROGRAVIMETER FOR GEOPHYSICAL PROSPECTING

(75) Inventors: Nicolo Beverini, Pisa (IT); Francesco Fidecaro, Pisa (IT); Andrea De Michele, Pisa (IT); Francesco Mango, Pisa (IT); Alessandro Bertolini, Hamburg (DE)

(73) Assignee: ENI S.p.A., Rome (IT)

( * ) Notice: Subject to any disclaimer, the term of this patent is extended or adjusted under 35 U.S.C. 154(b) by 554 days.

(21) Appl. No.: 12/529,821

(22) PCT Filed: Mar. 28, 2008

(86) PCT No.: PCT/IB2008/000738
§ 371 (c)(1),
(2), (4) Date: Sep. 3, 2009

(87) PCT Pub. No.: WO2008/120075
PCT Pub. Date: Oct. 9, 2008

(65) Prior Publication Data
US 2010/0071461 A1  Mar. 25, 2010

(30) Foreign Application Priority Data
Mar. 29, 2007  (IT) ................ PI2007A0036

(51) Int. Cl.
*G01V 7/00*  (2006.01)
(52) U.S. Cl.
USPC ................ 73/382 R; 73/382 G
(58) Field of Classification Search
USPC ........ 73/514.16, 382 R, 382 G; 324/635, 636
See application file for complete search history.

(56) References Cited

U.S. PATENT DOCUMENTS

| | | | | |
|---|---|---|---|---|
| 4,483,194 A | * | 11/1984 | Rudolf | 73/514.18 |
| 5,623,098 A | * | 4/1997 | Castleman et al. | 73/497 |
| 6,481,286 B1 | * | 11/2002 | Bernstein et al. | 73/514.31 |

OTHER PUBLICATIONS

Allessandro et al, "A Sapphire Monolithic Differential Accelerometer as Core Sensor for Gravity Gradiometric Geophysical Instrumentation", Annals of Geophysics, vol. 49, No. 4/5, Oct. 2006, pp. 1095-1103.
Martin et al, "Sapphire Resonator Transducer Accelerometer for Space Gravity", Journal of Physics . . . , vol. 27, No. 4, Apr. 14, 1994, pp. 875-880.
Thwaites et al, "Cantilever Coupled Impedance Matching Read-out for Resonant Bar Gravitational Wave Antennae", Measurement Science and Technology, Oct. 1, 1995, pp. 1437-1441.

* cited by examiner

*Primary Examiner* — John Chapman, Jr.
(74) *Attorney, Agent, or Firm* — Ladas & Parry LLP

(57) ABSTRACT

An apparatus and a method for measuring the gravitational acceleration on the ground, for example adapted to geophysical explorations applied to mining, including a base frame, a resonator having a first disc of sapphire integral to the base frame, and a second disc of sapphire arranged at a minimum distance from the first mass and aligned vertically with respect to the first mass such that the first and the second disc form a resonator for electromagnetic signals; a cantilever arm connected to the base frame and holding resiliently the second disc in order to provide a steady elastic modulus; a magnetic probe for applying an electromagnetic signal to the resonator arranged according to a plane existing between the two discs; a linear electric probe, arranged under the fixed disc aligned vertically with respect to its side edge, for measuring a resonance frequency of the resonator responsive to the electromagnetic signal, device for correlating the variation of the resonance frequency to a variation of distance between the discs, and a device for correlating the variation of distance to local gravitational acceleration.

20 Claims, 4 Drawing Sheets

MICROGRAVIMETER FOR GEOPHYSICAL PROSPECTING

FIELD OF THE INVENTION

The present invention relates to an apparatus and a method for measuring the gravitational acceleration on the ground.

Among possible applications there are fieldworks for ore and oil explorations or for environmental purposes, for detection in the underground cavities or in any case of discontinuity structures of natural or artificial origin. Other applications comprise structural researches on a larger scale with an air or marine carrier.

DESCRIPTION OF THE TECHNICAL PROBLEM

The geophysical analysis by means of microgravimetric prospecting is a methodology with many potentialities and increasing development.

Sensors for measuring the gravitational acceleration are known. A first type of sensors is commercialized by the company LRS (LaCoste & Romberg—Scintrex) Inc., and consists essentially of a spring, maintained in critic working conditions in order to enhance minimum variation of the force exerted on it. This apparatus measures values of the gravity obtaining a measurement of the gradient on the basis of two following readings on the same instrument in different positions. This apparatus, however, have the drawback of having the need of a strict control of the hysteresis and of the mechanical drift, to avoid that such effects overcome the useful signals.

To avoid the presence of such systematic effects on the measurements, it is known the differential detection, using two microgravimeters in parallel. This type of survey has also the essential advantage to obtain a direct measurement of the gradient of the gravitational field. The differential detection is presently used in apparatus of not commercial type, with exclusive use of laboratories for spatial applications or in physic experiments. An example is the superconductor gravimeter of the Maryland University and the gravimeter of IFSI—CNR. These instruments have very high resolution, for example and less than 0,01 Eötvös, but are not portable and not adapted to be used on the ground.

A portable tool known on the market is the GGI gravimeter (Gravity Gradiometer Instrument), developed by Lockheed Martine and used both for military and civilian purposes. Instruments of this type are expressly made for use on aircrafts or watercrafts and consist of two couples of equal accelerometers mounted orthogonally on a rotating platform. The linear acceleration in a direction perpendicular to the axis of rotation is thus modulated at the frequency of rotation, whereas the effect of the gradient is modulated at a double frequency. These instruments have a sensitivity of about 5 Eötvös.

It is also known the Bell Geospace Full Tensor Gravimeter, formed by several GGI and capable of measuring at the same time all the components of the gravitational gradient tensor $\Gamma$, allowing a full reconstruction of the gravimetric map. The very high performances of this instrument are however associated with a corresponding high cost, encumbrance and weight.

It is also known the Falcon Gravity Gravimeter of the Australian company BHP—Billiton Discovery Technologies, capable of observing sources that produce a gravimetric anomaly $\Gamma_z$>10 Eö rms, with a spatial resolution of 500 m.

Another instrument known is a movable superconductor gravimeter with balanced oscillating arms, developed by the University of Western Australia in 1994 and commercialized by Gedex Inc. The instrument, developed for air prospecting, is capable of having a CMRR>190 dB and a resolution better than 1 Eö at 1 Hz. However, it is not easily manageable, for the size of the inertial platform and for the need of having a liquid helium refrigeration system.

SUMMARY OF THE INVENTION

It is a feature of the present invention to provide an apparatus and a method for measuring the gradient of the gravitational acceleration on the ground, for various applications in the field of geophysical prospecting, adapted to achieve significant precision from an application-oriented viewpoint, even if maintaining limited size in order to be housed in a small self-propelled vehicle.

It is another feature of the present invention to provide such an apparatus for reducing the time necessary for each single measurement, in order to reduce remarkably the cost of a measurement campaign.

It is a further feature of the invention to provide such an apparatus that has an effective environmental and instrumental noise rejection, and that has a high disturbance rejection with respect to mechanical noise or earthquakes, capable of also of relieving the conditions of strict control of the instrumental working conditions.

It is also a feature of the invention to provide an apparatus capable of having a high measurement precision of the gravitational acceleration gradient.

Still a further feature of the invention is to provide an apparatus that reduces the need for controlling the mechanical and thermal hysteresis, and that avoids effects due to the fatigue of the material.

It is a further feature of the invention to provide an apparatus that is not affected by thermal variations.

These and other objects are achieved by an apparatus for microgravimetric, measurements for geophysical prospecting according to the present invention, whose characteristic is that it comprises:

a base frame;
a first mass integral to said base frame;
a second mass arranged at a minimum distance from said first mass and aligned vertically with respect to said first mass so that said first and said second mass form a resonator for electromagnetic radiation;
means for suspending said second mass, said means for suspending being connected to said base frame and holding resiliently said second mass in order to provide a steady elastic modulus;
means for applying an electromagnetic signal to said resonator;
means for measuring a resonance frequency of said resonator responsive to said electromagnetic signal,
means for correlating the variation of said resonance frequency to a variation of distance between said two masses, and
means for correlating the variation of distance to local gravitational acceleration.

Preferably, said second mass is above said first mass.

Preferably, a first and a second resonator are provided as above defined coupled and mounted on two respective base frames integral to each other for measuring the gravitational acceleration gradient in a vertical direction.

Advantageously, said resonators are contained in a closed box in which vacuum conditions have been created. This way the masses are free of moving without viscosity.

Preferably, the resonance frequency of the electromagnetic resonator is in the field of microwaves.

Advantageously, the means for measuring the difference between the resonance frequencies of the two resonators comprise a phase detecting interferometric circuit. This way this difference is read in a direct way comparing, with the above described interferometric circuit, the phase shift of the waves reflected by the two resonators.

Advantageously, the means for generating the microwave signal comprises a loop oscillator. The loop oscillator can use as cavity of reference one or more resonators of the gravimeter i.e. An external resonator.

Advantageously, said masses consist of sapphire discs located at a predetermined distance. Preferably, said distance is between 50 and 500 microns.

Preferably, the means for suspending said second mass comprises a torsion pendulum.

Advantageously, said torsion pendulum is obtained starting from a cut silicon lamina, in particular, a silicon monocrystalline lamina, said lamina having two opposite C-shaped cuts, in order to separate a fixed portion and a mobile portion, united to each other by two connecting portions urged by torsion by said second suspended mass and said mobile portion. This way, it is possible to avoid hysteresis and effects of fatigue of the material. The use of monocrystalline material for making said arm avoids undesirable effects due to fatigue of the material and to creep. In particular, said silicon lamina is cut by means of ultrasonic pulses.

Advantageously, said lamina is a beam selected from the group consisting of: a beam fixed to only one end, creating a cantilever, or a beam fixed to both ends, in both cases, the variation of distance between said two masses being the bend deflection of said lamina.

Advantageously, said sapphire discs are suitable to form a resonator that resonates in a way so-called "whispering gallery".

Advantageously, in case of differential measurements, said two resonators are arranged so that the heaviest masses are suspended on said laminas and capable of providing an equal resilient response.

Advantageously, in order that said two laminas have the same sensitivity to gravitational acceleration, means are provided for dampening the oscillation of each lamina without reducing the mechanical merit coefficient and without increasing the thermal noise either.

Preferably, said means for dampening comprises:
an electric winding integral to the base frame and adapted to create a magnetic field aligned vertically with respect to said first mass, facing said second mass;
a permanent magnet connected to said lamina of each of said resonators.

The signal of correction in the current to send to the winding is preferably proportional to the speed of the lamina.

Preferably, said speed of the lamina is determined with a laser system. Alternatively, said speed of movement can be determined with a derivator circuit revealing the phase of the wave reflected by a single resonator with respect to a reference signal.

Advantageously, the application is provided of a counterweight for balancing the mechanical oscillation frequency of the lamina, acting on the moment of inertia of the lamina same.

Advantageously, said lamina has a portion on which a metal layer is mounted, said metal layer facing at least one electrode fixed with respect to the base frame, between said metal layer and said at least one electrode an electromagnetic field being sent for weakening the effective elastic modulus of the system.

Preferably, means are provided for adjusting the unexcited distance between the discs, comprising a piezoelectric device on which said first mass is mounted. This way it is possible to control the electric resonance frequency $f_0$ and the transduction factor $\partial f/\partial l$ between the distance l and the frequency $f_0$.

Advantageously, means are provided for blocking the movement of the lamina when the sensor is not measuring or in case of shock during the operation.

In particular, said means for blocking comprises means for driving a magnet located on said lamina of said two couples of discs with a second coil that is excited for deviations from the working position larger than several microns, providing high returning forces.

Advantageously, said means for driving a magnet comprises a dampening circuit each of said first masses, comprising a laser sensor adapted to provide a reference of the blocking system that enters in operation when a threshold level is exceeded.

BRIEF DESCRIPTION OF THE DRAWINGS

Further characteristic and the advantages of the apparatus according to the invention will be made clearer with the following description of an exemplary embodiment thereof, exemplifying but not limitative, with reference to the attached drawings, in which like reference characters designate the same or similar parts, throughout the figures of which.

DESCRIPTION OF PREFERRED EXEMPLARY EMBODIMENTS

Figure 1:
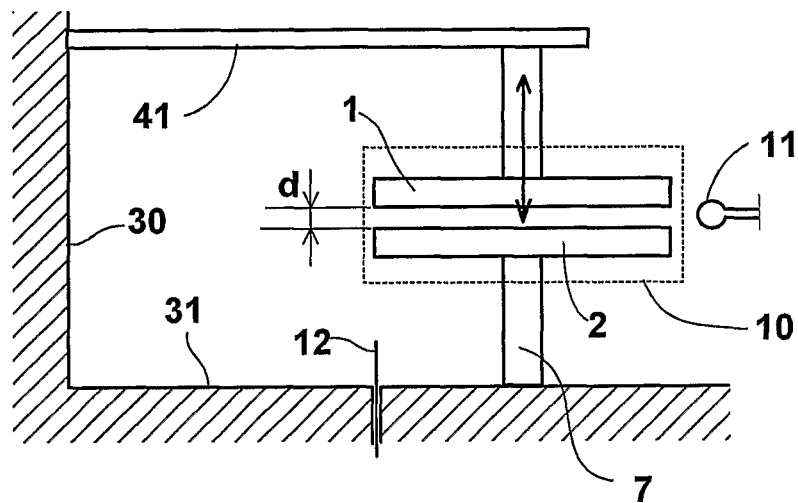
FIG. 1 shows diagrammatically a cross sectional view of an example of a gravimetric sensor consisting of a single resonator according to the invention, having a couple of discs, a fixed and an oscillating disc, where the oscillating disc is suspended to a cantilever lamina.

With reference to FIG. 1, a microwave resonator 10 is diagrammatically described of a microgravimeter according to the invention, in particular, for geophysical prospecting, for example adapted to geophysical explorations applied to mining. Resonator 10 comprises two oscillating masses and, in particular, a couple of sapphire discs 1 and 2, located at a distance d from each other, for example about 100 μm. The upper disc 1 is connected to a cantilever arm 41 connected to a fixed base frame comprising a stiff vertical wall 30 and a base 31 of homogeneous material.

Length and material of the vertical wall 30, of the base 31 and of all the structure carrying will be chosen by the skilled person without difficulty, in order to minimize the global thermal effect on the signal, with respect to the dilation and the variation of the resilient and dielectric constants.

The microwave signal is obtained with an "loop oscillator" that includes resonator 10 in transmission. In particular, in FIG. 1 advantageously a magnetic probe 11 is shown arranged in a plane existing between the two discs and 2. The signal is detected by a electric probe consisting of linear conductor 12 arranged under fixed disc 2 below its side edge.

Always with reference to FIG. 1, distance d between the two sapphire discs 1 and 2 is adjusted such that it, for standard values of g, is about 100 μm.

According to the invention, the resonance frequency of resonator 10 is influenced by different values of the gravitational acceleration g. Therefore, it is possible to evaluate the variation of g by monitoring the resonance frequency of resonator 10 in the field of microwaves (which is typically about 11 GHz) about 10.8 GHz. The monitoring step is made by repeating the frequency measurement in different geophysical points close to each other or during a continuous movement.

Figure 1A:
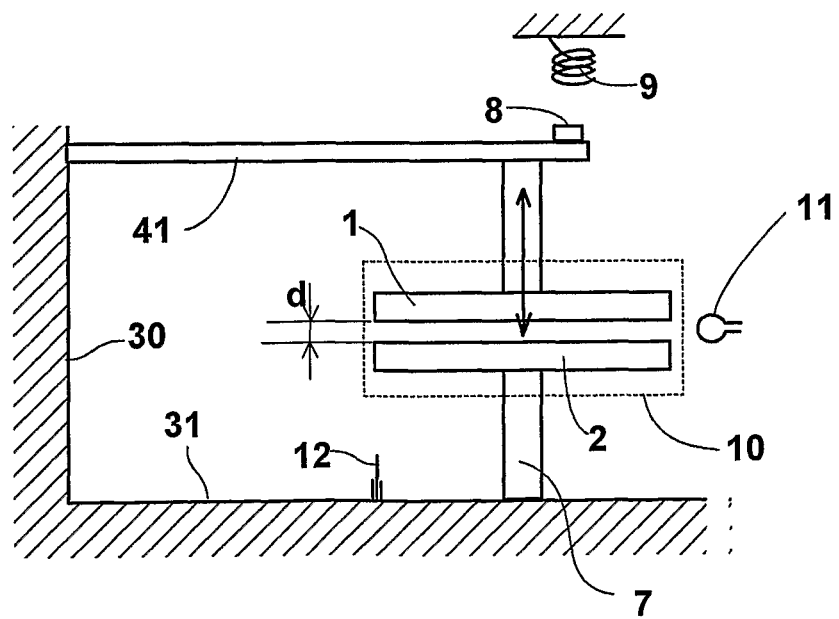
FIG. 1a shows an example of the gravimetric sensor having an active dampener.

Arm 41 has to be extremely responsive to the accelerometric signal. Furthermore, since the dynamic range of response of the sensor, is less than one μm, it is preferable to dampen the oscillation of arm 41, without reducing the mechanical quality factor and without increasing therefore the thermal noise. As shown in FIG. 1A, this is obtained with the advantageous application of the methodology of active dampening by an actuator, having a magnet 8 of reduced size connected to arm 41 and operated by a coil 9, integral to the fixed base frame, which applies to movable arm 41 an a.c. correction signal proportional to the speed of the arm same 41. This signal can be made by a differentiator circuit starting from a laser position sensor, not shown, i.e. measuring the movement of the resonance frequency of the resonator with respect to a local oscillator.

Figure 2:
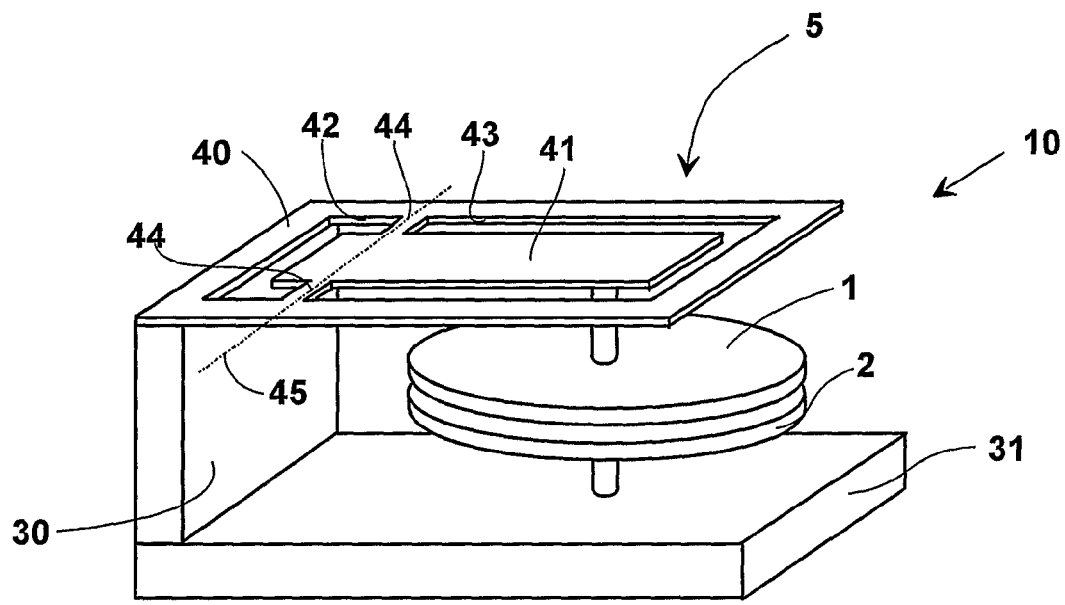
FIG. 2 shows a perspective view of the gravimetric sensor having a fixed disc and an oscillating disc, the lamina which is suspended the disc is a cut lamina.

As shown in FIG. 2, in a preferred exemplary embodiment, arm 41 can be advantageously made as a torsion pendulum hinged about horizontal axis 45. Arm 41 belongs to a support 5 obtained from a monocrystalline lamina 40 of silicon, cut for example by means of ultrasonic pulses. In particular, by the work to ultrasonic pulses in lamina 40 opposite C-shaped through slots 42 and 43 are obtained, of different lengths and defining arm 41, partly separating it from lamina 40. Arm 41, lamina 40 and the torsion hinges 44 about axis 45 are therefore parts of a single monolithic crystal. This solution is advantageous to avoid hysteresis, creep and effects of fatigue of the material. The monocrystalline lamina 40 is connected to wall 30 of fixed base frame.

Figure 3:
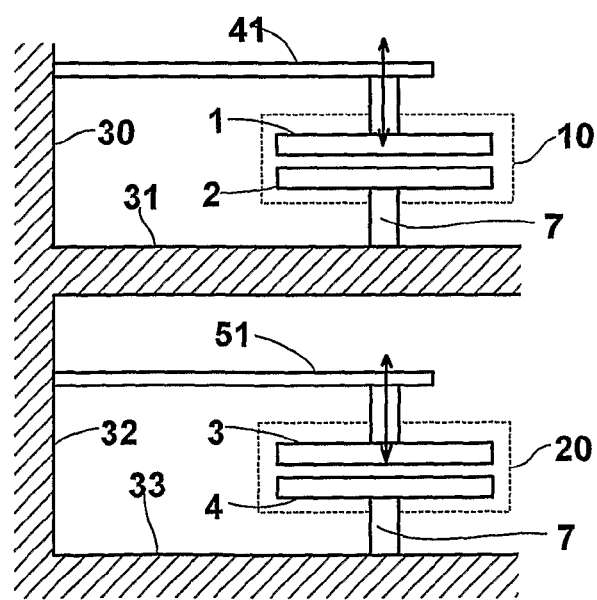
FIG. 3 shows diagrammatically a cross sectional view of an example of a gravimetric sensor according to the invention comprising two resonators, like that of FIG. 1, adapted to be used for carrying out a differential measurement between the resonance frequencies of the two resonators (distance between the two resonators is not to scale)
Figure 4:
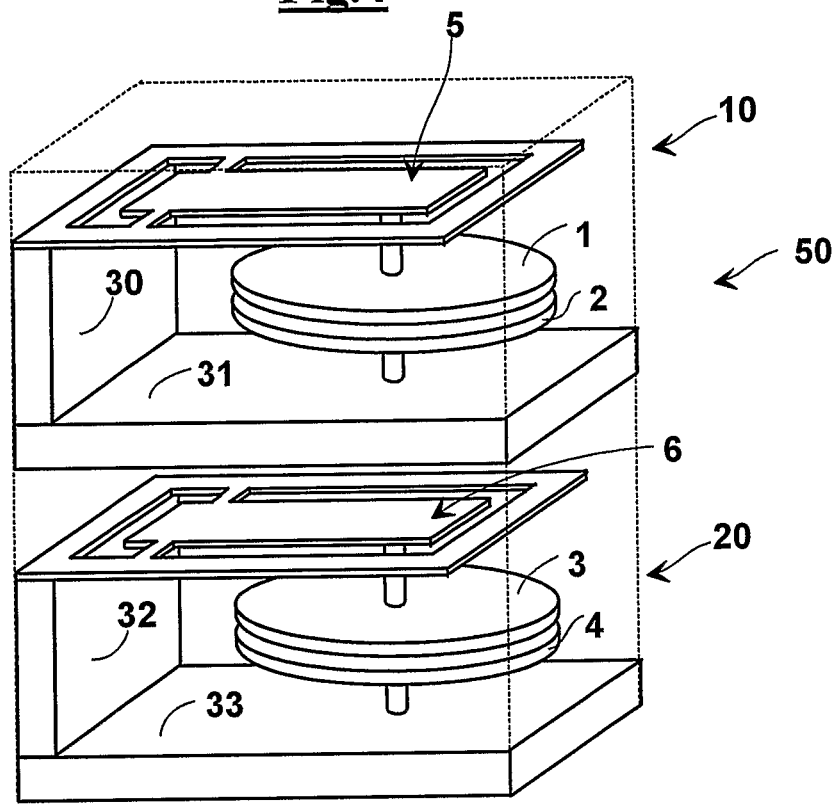
FIG. 4 shows a perspective view of the differential gravimeter where the oscillating masses are held by respective monocrystalline laminas as shown in FIG. 2.
Figure 5:
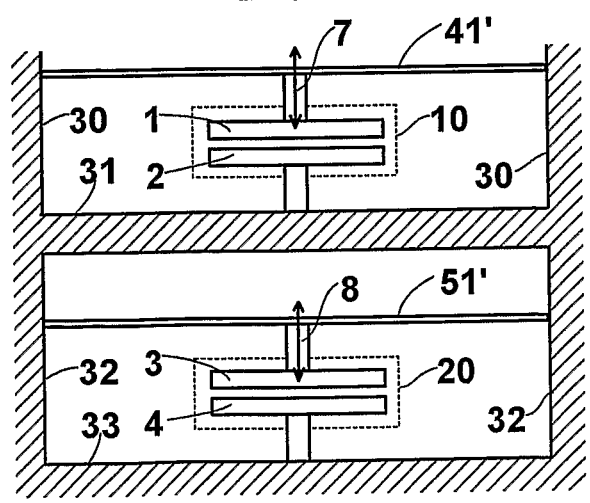
FIG. 5 shows diagrammatically a cross sectional view of a differential gravimeter having two couples of oscillating discs held by laminas fixed to both ends.

In a preferred exemplary embodiment, as shown in FIGS. 3, 4 and 5, a second oscillator 20 is used associated with oscillator 10, called a Server, equal to each other. For example, the distance between resonators 10 and 20 can be 20 cm, with a diameter of the discs of 4 cm.

This way, the variation of g are monitored with very high resolution, by comparing the resonance frequencies in the field of microwaves in band X by "whispering gallery" way of two resonators 10 and 20, each comprising two facing sapphire discs 1, 2, 3 and 4. The independent variables of the device according to the invention are the mechanical resonance frequency $f_m$, the electric resonance frequency $f_0$ and the separation d between the discs, which defines the factor of transfer $\partial f/\partial l$.

The resonating electromagnetic field can be mounted in a known way by a skilled person, for example by an excitation source not shown and of known type.

The two resonators 10 and 20 and the relative elements in the same boundary have to be perfectly the same.

Figure 6:
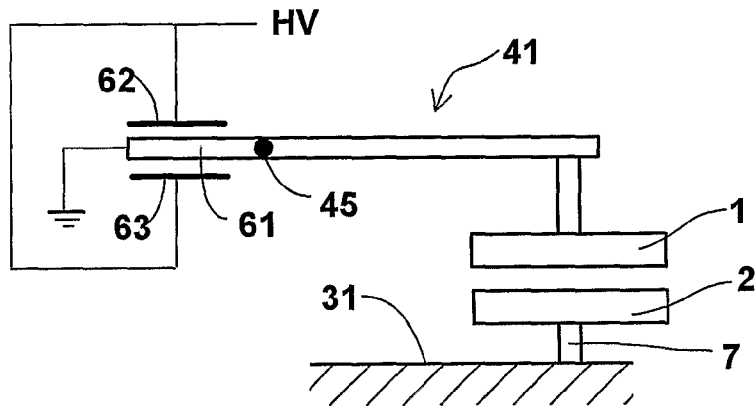
FIG. 6 shows a possible embodiment of dampening means.

For proceeding to the correction of the inevitable manufacturing and assembling defects small corrections are implemented in the following way. Firstly a rough correction is made for adjusting the moment of inertia by balancing the mechanical oscillation frequency by adding microweights to arm 41, in a not shown and known way. Furthermore, a fine adjustment is effected, operable remotely, on the elastic modulus with electric methods. For this purpose, as shown in FIG. 6, a metallization is provided of an end portion 61 of movable arm 41, opposite to axis 45, which has a counterweight, both on the upper surface and on the lower, and of surfaces 62 and 63 of fixed structure facing it. In particular, by arranging an electric field between the surfaces 62 and 63, with function of electrode, there is the effect of weakening the effective elastic torsion modulus about axis 45. The electric resonance frequency $f_0$ and the factor of transfer $\partial f/\partial l$ are controlled by adjusting the unexcited distance between the sapphire discs of the server unit (associated to resonator 10), by a support of variable length 7, for example a piezoelectric device, on which the lower disc 2 of resonator 10 is mounted.

For avoiding the potentially destructive effects of shocks between the sapphire discs 1 and 2 a safety system blocks the movement of arm 41 when resonator 10 is not measuring, or in case of shock during the operation. This blocking is obtained driving magnet 8 (FIG. 1A) located on movable arm 41 with a second coil (not shown) that is excited in case of deviations from the working raised position of several μm, providing high returning forces. A laser sensor (not shown) in use for dampening circuit 9 of the movable arm provides a reference which, if the threshold level is exceeded, the blocking system is referred to.

FIG. 4 shows diagrammatically and in a cross sectional view an exemplary embodiment of a gravimeter according to the invention having a couple of resonators 10 and 20 similar to that of FIG. 2, having the respective upper discs 1 and 3 integral to respective cantilever arms 41 and 51 and fixed at an end thereof to vertical stiff walls 30 and 32. The two resonators 10 and 20, are then mounted in a carton 50, indicated diagrammatically in FIG. 4, which forms a closed box and that separates the two resonators 10 and 20 by a base of homogeneous material. In closed box 50 vacuum conditions are created, such that the discs are free of moving without viscosity.

FIG. 5 shows a further exemplary embodiment of a gravimeter according to the invention having two resonators 10 and 20, whose upper discs are connected to respective laminas 41' and 51' fixed in order to respective vertical stiff walls 30 and 32, in a way similar to the system to lamina cut to obtain a movable arm as torsion pendulum.

The configuration of gravimeter comprising two resonators 10 and 20 mounted in series, as shown in FIGS. 3-5, carries out a direct measurement of the gravimetric data, comparing in a differential way the resonance frequency f of the two microwave resonators 10 and 20. Such a gravimeter allows measuring the gravitational gradient in a vertical direction of the gravitational acceleration vector with a resolution of 10 Eötvös ($10^{-8}$ $s^{-2}$). The difference between the resonance frequencies of the two resonators 10 and 20 is read in a direct way, comparing, with a phase detecting interferometric circuit, the resonance frequencies of the two resonators.

Figure 7:
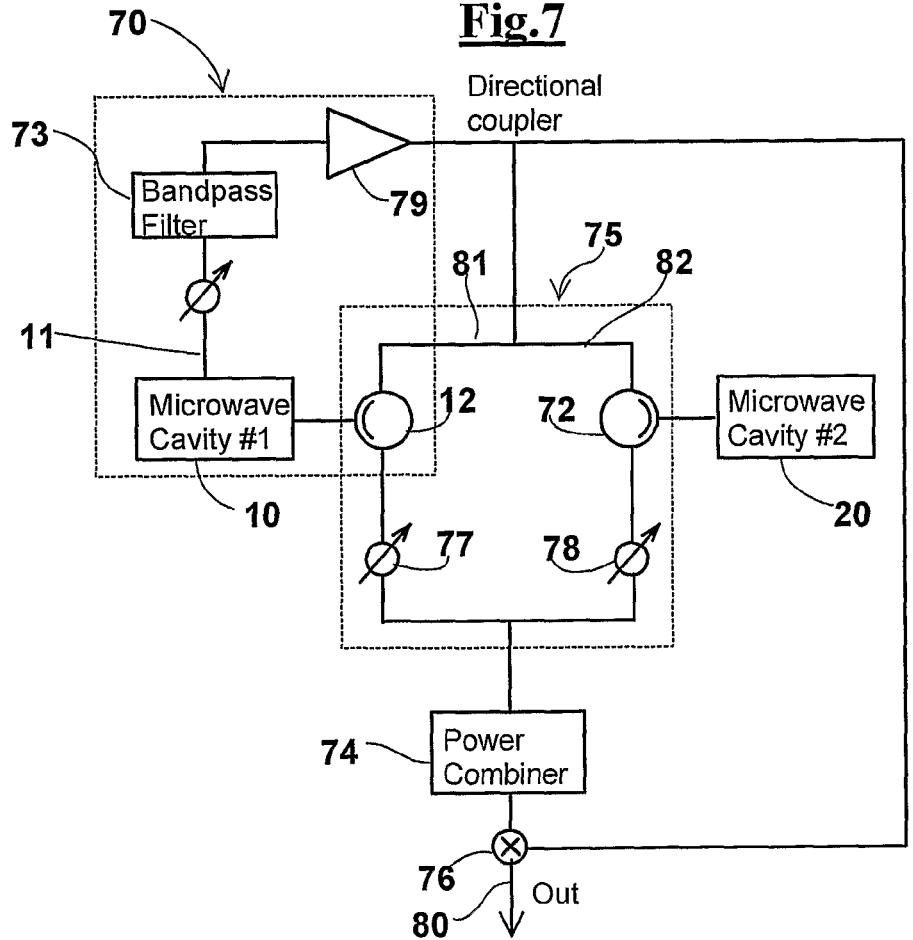
FIG. 7 shows an example of phase detecting interferometric circuit.

An example of such a interferometric circuit is shown in FIG. 7, in particular, referring to a gravity gradiometer according to the invention, wherein a microwave signal is obtained with a loop oscillator 70 that includes in transmission a resonator 10 of the gradiometer as cavity of reference. This radiation is addressed in reflection to the two cavities 10 and 20. In particular, the radiation of the local oscillator LO is equally apportioned to the two lines of transmission by a circulator 75, exciting the two resonators 10 and 20, respectively with the antennas 12 and 72. The phase shift of the wave reflected by each resonator 10 and 20 is proportional to the detuning between the frequency of LO and the resonance frequency of the resonator same. The reflected signals are recombined in opposition of phase, eliminating thus the common mode noise of LO, and revealed by mixer 76.

This arrangement ensures a common mode effective rejection of the external noise, also comprising noise of the kinematics of translation, provided a balancing as far as possible correct is ensured at the same time of the mechanical electric and features of the two resonators 10, 20. The master resonator 10 comprises two antennas, one with electric coupling 12 and one with magnetic coupling 11, whereas the second resonator 20 needs a single coupling antenna 72.

The difference in the value of g is revealed by measuring the mismatch of frequency between the two resonators by the interferometric circuit of FIG. 7. The microwave signal is obtained with a loop oscillator 70 that includes one of the resonators of the gravimeter as cavity of reference, and a microwave amplifier 79, with low noise and high gain.

The microwave radiation is sent into two branches 81 and 82 of the interferometer where it is coupled, through antennas 12 and 72, to two cavities 10 and 20, used in reflection. The power reflected by two cavities 10 and 20 is recombined by a 180° shifting of one of the branches (81 or 82) in order to have at the output 80 a signal zero when the circuit is perfectly balanced. This signal is observed by demodulating it in phase with respect to the loop oscillator 70, which feeds the whole circuit in a Double Balanced Mixer (DBM) 76. The output of the DBM 76 is proportional to the difference of frequency between the two cavities 10 and 20 as well as to the difference of acceleration. Bandpass filter 73 is inserted in the oscillator loop 70, and power combiner 74 merges the two microwave signals in output from the phase shifters 77 and 78.

EXAMPLE

An example is given below of sizing a gravity gradiometer according to the invention. This example relates to a gradiometer having two microwave resonators WGM formed each by two sapphire discs substantially equal to each other (see FIG. 4), with diameter 42 mm, height 5 mm, $\epsilon_r$=9.750 and $\epsilon_z$=11.350, of which both the merit factors of the various resonances in the band of interest, about 10-12 GHz, in which both the values of the transfer coefficient df/dz have been determined, to the light of the results obtained has been chosen the way $TM_{11,1,0+d}$, which represents the higher factor Qx(df/dz), i.e. about 300,000 MHz/mm, having a factor of merit Q≈58,000 and df/dz≈5 MHz/mm, with a gap between the two discs of about 100 µm.

For achieving a sensitivity necessary to measure 10 Eötvös, very small displacements have to be measured, about $10^{-13}$ m, and among the many causes of noise the effect of the temperature on the apparatus as a whole should be ascertained, i.e. torsion pendulum+microwave resonator. It is advantageous to set absorbing walls whose position has to be chosen in order to uncouple the resonator from the outer environment, without perturbating too much the Whispering Gallery of interest.

It is possible to compensate in temperature the resonators, or accelerometers, in a way suitable to reduce, up to a level compatible with the precision demand, the influence of the temperature on the only accelerometer, provided the values of the parameters that cause the variation of the resonance frequency of the cavity are determinate precisely, with a precision better than 1 ppm/K. To this purpose, it should be considered that the effects of the temperature on the resonance can be caused by the dependence of the dielectric constant of sapphire from temperature. In fact, by increasing the temperature increases and the frequency decreases that depends on the opposite of refraction index, i.e. from $\epsilon^{-1/2}$.

The effect of the temperature on the resonance can be caused also by the increasing volume of the sapphire discs, which causes a decrease of the resonance frequency. In particular, the measurements give as result a value of about 63.2 ppm/kelvin for the overall effect.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. An apparatus for micro-gravimetric measurements for geophysical prospecting, whose characteristic is that it comprises:
    a base frame;
    a first mass integral to said base frame;
    a second mass arranged at a distance from said first mass and aligned vertically with respect to said first mass, such that said first and said second mass form a resonator for electromagnetic radiation;
    means for suspending said second mass, said means for suspending being connected to said base frame and holding resiliently said second mass in order to provide a steady elastic modulus;
    means for applying an electromagnetic signal to said resonator;
    means for measuring a resonance frequency of said resonator responsive to said electromagnetic signal,
    means for correlating the variation of said resonance frequency to a variation of distance between said two masses, and
    means for correlating the variation of distance to local gravitational acceleration
    wherein said means for suspending said second mass comprises a torsion pendulum, obtained starting from a cut silicon lamina, said lamina having two opposite C-shaped cuts, in order to separate a fixed portion and a mobile portion, united to each other by two connecting portions urged by torsion by said second suspended mass and said mobile portion; and
    wherein said two masses consist of sapphire discs located at a predetermined distance.

2. An apparatus, according to claim 1, wherein said second mass is above said first mass.

3. An apparatus, according to claim 1, wherein a first and a second resonator are provided, coupled and mounted on two respective base frames integral to each other for carrying out a differential gravitational acceleration gradient measurement in a vertical direction.

4. An apparatus, according to claim 3, wherein said resonators are contained in a closed box in which vacuum conditions are created.

5. An apparatus, according to claim 3, where the resonance frequency of the electromagnetic resonator is in the field of microwaves.

6. An apparatus, according to claim 3, wherein the means for measuring the difference between the resonance frequencies of the two resonators comprise a phase detecting interferometric circuit.

7. An apparatus, according to claim 3, wherein, in case of differential measurements, said two resonators are arranged such that the heaviest masses are suspended on said laminas and are capable of providing an equal resilient response.

8. An apparatus, according to claim 7, wherein said two laminas have the same sensitivity to gravitational acceleration through means for dampening oscillation of each lamina without reducing quality factor and without increasing the thermal noise either; said means for dampening comprises:
- a electric winding integral to the base frame and adapted to create a magnetic field aligned vertically with respect to said first mass, facing said second mass;
- a permanent magnet connected to said lamina of each of said resonators.

9. An apparatus, according to claim 8, wherein speed of movement can be determined with a differentiator circuit revealing the phase of a wave reflected by a single resonator with respect to a reference signal.

10. An apparatus, according to claim 7, wherein the application is provided of a counterweight for balancing mechanical oscillation of the lamina, acting on the moment of inertia of the lamina same.

11. An apparatus, according to claim 7, wherein said or each lamina has a portion on which a metal layer is mounted, said metal layer facing at least one electrode fixed with respect to the base frame, between said metal layer and said at least one electrode, and comprising a means for sending an electromagnetic field between the metal layer and the at least one electrode for weakening the effective elastic modulus of the system.

12. An apparatus, according to claim 7, wherein means are provided for blocking the movement of the torsion pendulum when the sensor is not measuring or in case of shock during the operation.

13. An apparatus, according to claim 12, wherein said means for blocking comprises means for driving a magnet located on said torsion pendulum of said two couples of discs with a coil that is excited for deviations from the working position larger than several microns, providing high returning forces.

14. An apparatus, according to claim 13, wherein said means for driving a magnet comprises a dampening circuit for each of said first masses, comprising a laser sensor adapted to provide a reference of the blocking system that enters in operation when a threshold level is exceeded.

15. An apparatus, according to claim 1, where the means for applying the electromagnetic signal comprises a loop oscillator, said loop oscillator using, as cavity of reference, one or more resonators of the gravimeter or an external resonator.

16. An apparatus, according to claim 1, wherein said sapphire discs are suitable to form a resonator that resonates in a way so-called "whispering gallery".

17. An apparatus, according to claim 16, wherein means are provided for adjusting the unexcited distance between the discs, comprising a piezoelectric device on which said first mass is mounted.

18. An apparatus, according to claim 1, wherein the cut silicon lamina is a silicon monocrystalline lamina.

19. An apparatus, according to claim 1, wherein the distance is between 50 and 500 microns.

20. An apparatus, according to claim 1, wherein the diameter of the sapphire discs is 4 cm.

* * * * *